United States Patent
Kim et al.

(10) Patent No.: US 10,311,321 B1
(45) Date of Patent: Jun. 4, 2019

(54) LEARNING METHOD, LEARNING DEVICE USING REGRESSION LOSS AND TESTING METHOD, TESTING DEVICE USING THE SAME

(71) Applicant: Stradvision, Inc., Pohang (KR)

(72) Inventors: Kye-Hyeon Kim, Seoul (KR); Yongjoong Kim, Pohang-si (KR); Insu Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Donghun Yeo, Pohang-si (KR); Wooju Ryu, Pohang-si (KR); Taewoong Jang, Seoul (KR); Kyungjoong Jeong, Pohang-si (KR); Hongmo Je, Pohang-si (KR); Hojin Cho, Pohang-si (KR)

(73) Assignee: Stradvision, Inc., Pohang (KR)

( * ) Notice: Subject to any disclaimer, the term of this patent is extended or adjusted under 35 U.S.C. 154(b) by 0 days.

(21) Appl. No.: 16/171,601

(22) Filed: Oct. 26, 2018

(51) Int. Cl.
| G06N 5/04 | (2006.01) |
| G06K 9/34 | (2006.01) |
| G06N 3/04 | (2006.01) |
| G06F 17/18 | (2006.01) |
| G06N 3/08 | (2006.01) |

(52) U.S. Cl.
CPC ............ *G06K 9/34* (2013.01); *G06F 17/18* (2013.01); *G06N 3/04* (2013.01); *G06N 3/084* (2013.01); *G06N 5/046* (2013.01)

(58) Field of Classification Search
None
See application file for complete search history.

(56) References Cited

U.S. PATENT DOCUMENTS

| 9,471,836 | B1 * | 10/2016 | Kim | G06K 9/3241 |
| 9,947,103 | B1 * | 4/2018 | Kim | G06T 7/12 |
| 9,947,228 | B1 * | 4/2018 | Kim | G08G 1/167 |
| 9,953,236 | B1 * | 4/2018 | Huang | G06K 9/34 |
| 10,007,865 | B1 * | 6/2018 | Kim | G06K 9/6231 |
| 10,037,610 | B1 * | 7/2018 | Kim | G06T 7/246 |
| 10,089,743 | B1 * | 10/2018 | Kim | G06T 7/11 |
| 10,095,977 | B1 * | 10/2018 | Kim | G06N 3/0454 |
| 10,169,679 | B1 * | 1/2019 | Kim | G06K 9/6256 |
| 10,223,614 | B1 * | 3/2019 | Kim | G06K 9/6262 |

(Continued)

*Primary Examiner* — Paulinho E Smith
(74) *Attorney, Agent, or Firm* — Xsensus, LLP

(57) ABSTRACT

A method for learning parameters of a CNN based on regression losses is provided. The method includes steps of: a learning device instructing a first to an n-th convolutional layers to generate a first to an n-th encoded feature maps; instructing an n-th to a first deconvolutional layers to generate an n-th to a first decoded feature maps from the n-th encoded feature map; generating an obstacle segmentation result by referring to a feature of the decoded feature maps; generating the regression losses by referring to differences of distances between each location of the specific rows, where bottom lines of nearest obstacles are estimated as being located per each of columns of a specific decoded feature map, and each location of exact rows, where the bottom lines are truly located per each of the columns on a GT; and backpropagating the regression losses, to thereby learn the parameters.

28 Claims, 11 Drawing Sheets
(2 of 11 Drawing Sheet(s) Filed in Color)

(56) References Cited

U.S. PATENT DOCUMENTS

| | | |
|---|---|---|
| 10,229,346 B1* | 3/2019 | Kim ..................... G06K 9/6262 |
| 2017/0262735 A1* | 9/2017 | Ros Sanchez ....... G06K 9/6256 |
| 2018/0114071 A1* | 4/2018 | Wang ................. G06K 9/00744 |
| 2018/0165551 A1* | 6/2018 | Roh ...................... G06K 9/3233 |
| 2018/0253647 A1* | 9/2018 | Yu ......................... G06N 3/082 |
| 2018/0260956 A1* | 9/2018 | Huang .................... G06N 3/02 |
| 2019/0004535 A1* | 1/2019 | Huang ................. G05D 1/0251 |
| 2019/0050653 A1* | 2/2019 | Natroshvili ........ G06K 9/00805 |

* cited by examiner

FIG. 5
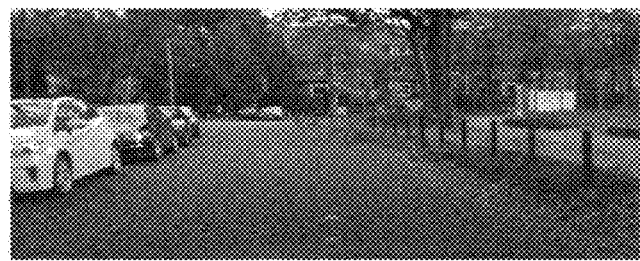
INPUT IMAGE
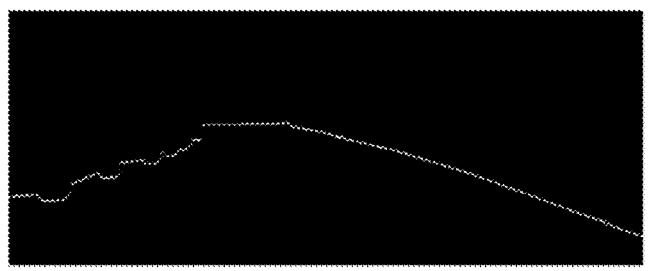
GROUNG TRUTH (GT)

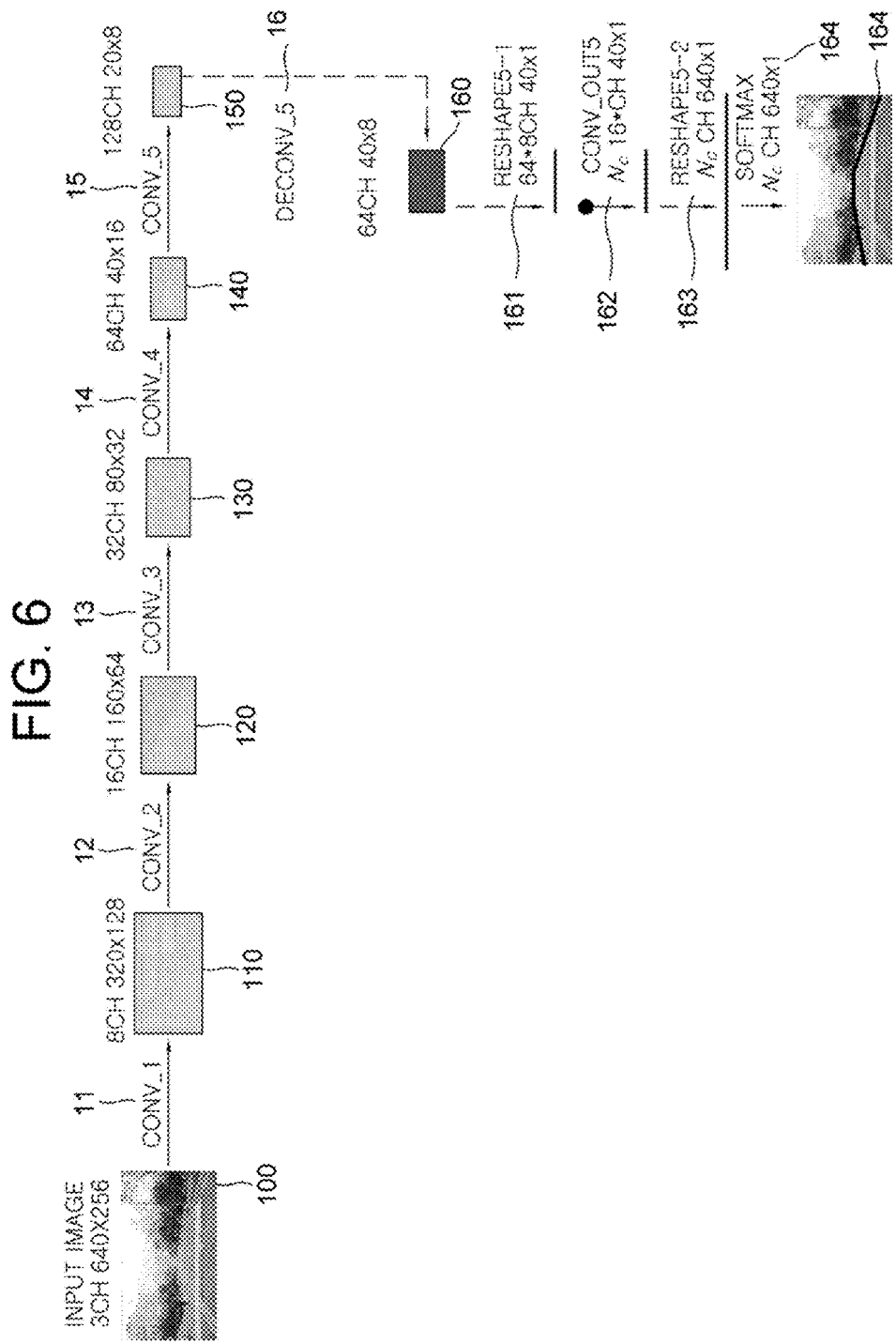

LEARNING METHOD, LEARNING DEVICE USING REGRESSION LOSS AND TESTING METHOD, TESTING DEVICE USING THE SAME

FIELD OF THE INVENTION

The present invention relates to a method for learning one or more parameters of a CNN based on one or more regression losses; and more particular, to the method for learning the parameters of the CNN based on the regression losses including steps of: (a) instructing a first convolutional layer to an n-th convolutional layer to respectively and sequentially generate a first encoded feature map to an n-th encoded feature map from at least one input image as a training image; (b) instructing an n-th deconvolutional layer to a first deconvolutional layer to sequentially generate an n-th decoded feature map to a first decoded feature map from the n-th encoded feature map; (c) on condition that each cell of a grid with a plurality of rows and a plurality of columns is generated by dividing at least one specific decoded feature map, among the n-th decoded feature map to the first decoded feature map, with respect to a first direction and a second direction, wherein the first direction is in a direction of the rows of the specific decoded feature map and the second direction is in a direction of the columns thereof, generating at least one obstacle segmentation result representing each of specific rows, where each of bottom lines of each of nearest obstacles is estimated as being located per each of the columns, by referring to at least one feature of at least part of the n-th decoded feature map the first decoded feature map; (d) generating the regression losses by referring to each of respective differences of distances between (i) each location of exact rows where each of the bottom lines of each of the nearest obstacles is truly located per each of the columns on at least one GT, for each of the columns, and (ii) each location of the specific rows where each of the bottom lines of each of the nearest obstacles is estimated as being located per each of the columns on the obstacle segmentation result; and (e) the backpropagating the regression losses, to thereby learn the parameters of the CNN, and a learning device, a testing method, and a testing device using the same.

BACKGROUND OF THE INVENTION

Deep learning is a technology used to cluster or classify objects or data. For example, computers cannot distinguish dogs and cats from photographs alone. But a human can easily distinguish those two. To this end, a method called "machine learning" was devised. It is a technique to allow a computer to classify similar things among lots of data inputted into the computer. When a photo of an animal similar to a dog is inputted, the computer will classify it as a dog photo.

There have already been many machine learning algorithms to classify data. For example, a decision tree, a Baynesian network, a support vector machine (SVM), an artificial neural network, etc. have been developed. The deep learning is a descendant of the artificial neural network.

Deep Convolution Neural Networks (Deep CNNs) are at the heart of the remarkable development in deep learning. CNNs have already been used in the 90's to solve the problems of character recognition, but their use has become as widespread as it is now thanks to recent research. These deep CNNs won the 2012 ImageNet image classification tournament, crushing other competitors. Then, the convolution neural network became a very useful tool in the field of the machine learning.

FIG. 1 is a drawing schematically illustrating a conventional process of a general segmentation by using a conventional CNN.

By referring to FIG. 1, according to the conventional lane detection method, a learning device receives an input image, generates feature maps by multiple convolution operations and non-linear operations like ReLU in multiple convolutional layers, and generates a segmentation result by performing multiple deconvolution operations in multiple deconvolutional layers and SoftMax operations on a last of the feature maps.

On the other hand, a conventional method of a lane segmentation has to segment every pixel in the input image, and check every pixel to determine whether the pixel corresponds to a lane or not. Such the conventional method requires a tremendous amount of computation caused by checking every pixel, which is clearly a problem.

Meanwhile, when performing the lane segmentation for autonomous vehicles, there is no need for segmentation of all objects within the input image, but detecting only obstacles to the autonomous vehicles should suffice.

Thus a new method for detecting only the obstacles within the input image is required.

Further, better learning method for detecting the nearest obstacles within the input image is in demand.

SUMMARY OF THE INVENTION

It is an object of the present invention to solve all the aforementioned problems.

It is another object of the present invention to provide a new method of detecting nearest obstacles, for autonomous vehicles.

It is still another object of the present invention to provide a method for fast detection of locations of the nearest obstacles in an input image with less computation, without checking every pixel in the input image.

It is still yet another object of the present invention to provide a method for precise detection of locations of the nearest obstacles in the input image.

In accordance with one aspect of the present invention, there is provided a method for learning one or more parameters of a CNN based on one or more regression losses, including steps of: (a) a learning device instructing a first convolutional layer to an n-th convolutional layer to respectively and sequentially generate a first encoded feature map to an n-th encoded feature map from at least one input image as a training image; (b) the learning device instructing an n-th deconvolutional layer to a first deconvolutional layer to sequentially generate an n-th decoded feature map to a first decoded feature map from the n-th encoded feature map; (c) the learning device, on condition that each cell of a grid with a plurality of rows and a plurality of columns is generated by dividing at least one specific decoded feature map, among the n-th decoded feature map to the first decoded feature map, with respect to a first direction and a second direction, wherein the first direction is in a direction of the rows of the specific decoded feature map and the second direction is in a direction of the columns thereof, generating at least one obstacle segmentation result representing each of specific rows, where each of bottom lines of each of nearest obstacles is estimated as being located per each of the columns, by referring to at least one feature of at least part of the n-th decoded feature map to the first decoded feature map; (d) the learning device generating the regression losses by referring to each of respective differences of distances between (i) each location of exact rows where each of the bottom lines of each of the nearest obstacles is truly located per each of the columns on at least one GT, for each of the columns, and (ii) each location of the specific rows where each of the bottom lines of each of the nearest obstacles is estimated as being located per each of the columns on the obstacle segmentation result; and (e) the learning device backpropagating the regression losses, to thereby learn the parameters of the CNN.

As one example, at the step of (c), the learning device calculates one or more softmax losses by referring to (i) each location and each probability of the specific rows having each of highest possibilities of each of the bottom lines of each of the nearest obstacles being present per each of the columns according to the obstacle segmentation result, and (ii) their corresponding GTs, and, at the step of (e), one or more integrated losses are generated by applying each of respective weights to the softmax losses and the regression losses, and then the integrated losses are backpropagated.

As one example, at the step of (c), the obstacle segmentation result is generated by a softmax operation which normalizes each value corresponding to each of the rows per each of the columns, and, at the step of (d), the obstacle segmentation result is adjusted to reduce each of differences between (i) each of probability values of each of the specific rows per each of the columns and (ii) each of probability values of neighboring rows per each of the columns within a certain distance from each of the specific rows per each of the columns, by using one or more regression operations.

As one example, at the step of (d), the regression losses are generated by referring to each of the respective differences of distances between (i) each location of the specific rows having each of highest scores per each of the columns on the obstacle segmentation result and (ii) each location of the exact rows having each of highest scores per each of the columns on the GT.

As one example, the step of (c) includes steps of: (c1) the learning device, supposing that each cell of the grid has been generated by dividing the at least one decoded feature map with respect to the first direction by first intervals and with respect to the second direction by second intervals, concatenating each of features of each of the rows per each of the columns in a direction of a channel, to thereby generate at least one reshaped feature map; and (c2) the learning device generating the obstacle segmentation result which represents where each of the bottom lines of each of the nearest obstacles is estimated as being located among the rows for each of the columns by referring to the reshaped feature map via checking each of estimated positions of each of the bottom lines of each of the nearest obstacles among concatenated channels for each of the columns, wherein the obstacle segmentation result is generated by a softmax operation which normalizes each value corresponding to each channel per each of the columns.

As one example, each of the columns includes one or more pixels in the first direction, and each of the rows includes one or more pixels in the second direction.

As one example, the GT includes information representing on which row each of the bottom lines of each of the nearest obstacles is truly located among the rows, per each of the columns, resulting from dividing the input image into $N_c$ rows, and wherein the obstacle segmentation result represents on which row each of the bottom lines of each of the nearest obstacles is estimated as being located among the rows, per each of the columns, resulting from dividing the input image into $N_c$ rows.

In accordance with another aspect of the present invention, there is provided a testing method by using a CNN capable of detecting one or more nearest obstacles based on one or more regression losses, including steps of: (a) a testing device acquiring at least one test image as at least one input image, on condition that the learning device has performed processes of (i) instructing a first convolutional layer to an n-th convolutional layer to respectively and sequentially generate a first encoded feature map for training to an n-th encoded feature map for training from at least one training image, (ii) instructing an n-th deconvolutional layer to a first deconvolutional layer to sequentially generate an n-th decoded feature map for training to a first decoded feature map for training from the n-th encoded feature map for training, (iii) assuming that each cell of a grid with a plurality of rows and a plurality of columns is generated by dividing at least one specific decoded feature map for training, among the n-th decoded feature map for training to the first decoded feature map for training, with respect to a first direction and a second direction, wherein the first direction is in a direction of the rows of the specific decoded feature map for training and the second direction is in a direction of the columns thereof, generating at least one obstacle segmentation result for training representing each of specific rows for training, where each of bottom lines of each of nearest obstacles for training is estimated as being located per each of the columns, by referring to at least one feature of at least part of the n-th decoded feature map for training to the first decoded feature map for training, (iv) generating the regression losses by referring to each of respective differences of distances between (iv-1) each location of exact rows where each of the bottom lines of each of the nearest obstacles for training is truly located per each of the columns on at least one GT, for each of the columns, and (iv-2) each location of the specific rows for training where each of the bottom lines of each of the nearest obstacles for training is estimated as being located per each of the columns on the obstacle segmentation result for training, and (v) backpropagating the regression losses, to thereby learn one or more parameters of the CNN; (b) the testing device instructing the first convolutional layer to the n-th convolutional layer to respectively and sequentially generate a first encoded feature map for testing to an n-th encoded feature map for testing from the test image; (c) the testing device instructing the n-th deconvolutional layer to the first deconvolutional layer to sequentially generate an n-th decoded feature map for testing to a first decoded feature map for testing from the n-th encoded feature map for testing; and (d) the testing device, assuming that each cell of a grid with a plurality of rows and a plurality of columns is generated by dividing at least one specific decoded feature map for testing, among the n-th decoded feature map for testing to the first decoded feature map for testing, with respect to the first direction and the second direction, wherein the first direction is in a direction of the rows of the specific decoded feature map for testing and the second direction is in a direction of the columns thereof, generating at least one obstacle segmentation result for testing representing each of specific rows for testing, where each of bottom lines of each of nearest obstacles for testing is estimated as being located per each of the columns, by referring to at least one feature of at least part of the n-th decoded feature map for testing to the first decoded feature map for testing.

As one example, at the process of (iii), the learning device has calculated one or more softmax losses by referring to (i) each location and each probability of the specific rows for training having each of highest possibilities of each of the bottom lines of each of the nearest obstacles for training being present per each of the columns according to the obstacle segmentation result for training, and (ii) their corresponding GTs, and, at the process of (v), one or more integrated losses has been generated by applying each of respective weights to the softmax losses and the regression losses, and then the integrated losses are backpropagated.

As one example, at the process of (iii), the obstacle segmentation result for training has been generated by a softmax operation which normalizes each value corresponding to each of the rows per each of the columns, and, at the process of (iv), the obstacle segmentation result for training has been adjusted to reduce each of differences between (i) each of probability values of each of the specific rows for training per each of the columns and (ii) each of probability values of neighboring rows per each of the columns within a certain distance from each of the specific rows for training per each of the columns, by using one or more regression operations.

As one example, at the process of (iv), the regression losses have been generated by referring to each of the respective differences of distances between (i) each location of the specific rows for training having each of highest scores per each of the columns on the obstacle segmentation result for training and (ii) each location of the exact rows having each of highest scores per each of the columns on the GT.

As one example, the step of (d) includes steps of: (d1) the testing device, supposing that each cell of the grid has been generated by dividing the at least one decoded feature map for testing with respect to the first direction by first intervals and with respect to the second direction by second intervals, concatenating each of features for testing of each of the rows per each of the columns in a direction of a channel, to thereby generate at least one reshaped feature map for testing; and (d2) the testing device generating the obstacle segmentation result for testing which represents where each of the bottom lines of each of the nearest obstacles for testing is estimated as being located among the rows for each of the columns by referring to the reshaped feature map for testing via checking each of estimated positions of each of the bottom lines of each of the nearest obstacles for testing among concatenated channels for each of the columns, wherein the obstacle segmentation result for testing is generated by a softmax operation which normalizes each value corresponding to each channel per each of the columns.

As one example, each of the columns includes one or more pixels in the first direction, and each of the rows includes one or more pixels in the second direction.

As one example, the GT includes information representing on which row each of the bottom lines of each of the nearest obstacles for training is truly located among the rows, per each of the columns, resulting from dividing the training image into $N_c$ rows, and wherein the obstacle segmentation result for training represents on which row each of the bottom lines of each of the nearest obstacles for training is estimated as being located among the rows, per each of the columns, resulting from dividing the training image into $N_c$ rows.

In accordance with still another aspect of the present invention, there is provided a learning device for learning one or more parameters of a CNN based on one or more regression losses, including: a communication part for acquiring at least one input image as a training image; and a processor for performing processes of (I) instructing a first convolutional layer to an n-th convolutional layer to respectively and sequentially generate a first encoded feature map to an n-th encoded feature map from the input, (II) instructing an n-th deconvolutional layer to a first deconvolutional layer to sequentially generate an n-th decoded feature map to a first decoded feature map from the n-th encoded feature map, (III) on condition that each cell of a grid with a plurality of rows and a plurality of columns is generated by dividing at least one specific decoded feature map, among the n-th decoded feature map to the first decoded feature map, with respect to a first direction and a second direction, wherein the first direction is in a direction of the rows of the specific decoded feature map and the second direction is in a direction of the columns thereof, generating at least one obstacle segmentation result representing each of specific rows, where each of bottom lines of each of nearest obstacles is estimated as being located per each of the columns, by referring to at least one feature of at least part of the n-th decoded feature map to the first decoded feature map, (IV) generating the regression losses by referring to each of respective differences of distances between (i) each location of exact rows where each of the bottom lines of each of the nearest obstacles is truly located per each of the columns on at least one GT, for each of the columns, and (ii) each location of the specific rows where each of the bottom lines of each of the nearest obstacles is estimated as being located per each of the columns on the obstacle segmentation result, and (V) backpropagating the regression losses, to thereby learn the parameters of the CNN.

As one example, at the process of (III), the processor calculates one or more softmax losses by returning to (i) each location and each probability of the specific rows having each of highest possibilities of each of the bottom lines of each of the nearest obstacles being present per each of the columns according to the obstacle segmentation result, and (ii) their corresponding GTs, and, at the process of (V), one or more integrated losses are generated applying each of respective weights to the softmax losses and the regression losses, and then the integrated losses are backpropagated.

As one example, at the process of (III), the obstacle segmentation result is generated by a softmax operation which normalizes each value corresponding to each of the rows per each of the columns, and, at the process of (IV), the obstacle segmentation result is adjusted to reduce each of differences between (i) each of probability values of each of the specific rows per each of the columns and (ii) each of probability values of neighboring rows per each of the columns within a certain distance from each of the specific rows per each of the columns, by using one or more regression operations.

As one example, at the process of (IV), the regression losses are generated by referring to each of the respective differences of distances between (i) each location of the specific rows having each of highest scores per each of the columns on the obstacle segmentation result and (ii) each location of the exact rows having each of highest scores per each of the columns on the GT.

As one example, the process of (III) includes processes of: (III-1) supposing that each cell of the grid has been generated by dividing the at least one decoded feature map with respect to the first direction by first intervals and with respect to the second direction by second intervals, concatenating each of features of each of the rows per each of the columns in a direction of a channel, to thereby generate at least one reshaped feature map; and (III-2) generating the obstacle segmentation result which represents where each of the bottom lines of each of the nearest obstacles is estimated as being located among the rows for each of the columns by referring to the reshaped feature map via checking each of estimated positions of each of the bottom lines of each of the nearest obstacles among concatenated channels for each of the columns, wherein the obstacle segmentation result is generated by a softmax operation which normalizes each value corresponding to each channel per each of the columns.

As one example, each of the columns includes one or more pixels in the first direction, and each of the rows includes one or more pixels in the second direction.

As one example, the GT includes information representing on which row each of the bottom lines of each of the nearest obstacles is truly located among the rows, per each of the columns, resulting from dividing the input image into $N_c$ rows, and wherein the obstacle segmentation result represents on which row each of the bottom lines of each of the nearest obstacles is estimated as being located among the rows, per each of the columns, resulting from dividing the input image into $N_c$ rows.

In accordance with still yet another aspect of the present invention, there is provided a testing device by using a CNN capable of detecting one or more nearest obstacles based on one or more regression losses, including: a communication part for acquiring at least one test image as at least one input image, on condition that the learning device has performed processes of (i) instructing a first convolutional layer to an n-th convolutional layer to respectively and sequentially generate a first encoded feature map for training to an n-th encoded feature map for training from at least one training image, (ii) instructing an n-th deconvolutional layer to a first deconvolutional layer to sequentially generate an n-th decoded feature map for training to a first decoded feature map for training from the n-th encoded feature map for training, (iii) assuming that each cell of a grid with a plurality of rows and a plurality of columns is generated by dividing at least one specific decoded feature map for training, among the n-th decoded feature map for training to the first decoded feature map for training, with respect to a first direction and a second direction, wherein the first direction is in a direction of the rows of the specific decoded feature map for training and the second direction is in a direction of the columns thereof, generating at least one obstacle segmentation result for training representing each of specific rows for training, where each of bottom lines of each of nearest obstacles for training is estimated as being located per each of the columns, by referring to at least one feature of at least part of the n-th decoded feature map for training to the first decoded feature map for training, (iv) generating the regression losses by referring to each of respective differences of distances between (iv-1) each location of exact rows where each of the bottom lines of each of the nearest obstacles for training is truly located per each of the columns on at least one GT, for each of the columns, and (iv-2) each location of the specific rows for training where each of the bottom lines of each of the nearest obstacles for training is estimated as being located per each of the columns on the obstacle segmentation result for training, and (v) backpropagating the regression losses, to thereby learn one or more parameters of the CNN; and a processor for performing processes of (I) instructing the first convolutional layer to the n-th convolutional layer to respectively and sequentially generate a first encoded feature map for testing to an n-th encoded feature map for testing from the test image, (II) instructing the n-th deconvolutional layer to the first deconvolutional layer to sequentially generate an n-th decoded feature map for testing to a first decoded feature map for testing from the n-th encoded feature map for testing, and (III) assuming that each cell of a grid with a plurality of rows and a plurality of columns is generated by dividing at least one specific decoded feature map for testing, among the n-th decoded feature map for testing to the first decoded feature map for testing, with respect to the first direction and the second direction, wherein the first direction is in a direction of the rows of the specific decoded feature map for testing and the second direction is in a direction of the columns thereof, generating at least one obstacle segmentation result for testing representing each of specific rows for testing, where each of bottom lines of each of nearest obstacles for testing is estimated as being located per each of the columns, by referring to at least one feature of at least part of the n-th decoded feature map for testing to the first decoded feature map for testing.

As one example, at the process of (iii), the learning device has calculated one or more softmax losses by referring to (i) each location and each probability of the specific rows for training having each of highest possibilities of each of the bottom lines of each of the nearest obstacles for training being present per each of the columns according to the obstacle segmentation result for training, and (ii) their corresponding GTs, and, at the process of (v), one or more integrated losses has been generated by applying each of respective weights to the softmax losses and the regression losses, and then the integrated losses are backpropagated.

As one example, at the process of (iii), the obstacle segmentation result for training has been generated by a softmax operation which normalizes each value corresponding to each of the rows per each of the columns, and, at the process of (iv), the obstacle segmentation result for training has been adjusted to reduce each of differences between (i) each of probability values of each of the specific rows for training per each of the columns and (ii) each of probability values of neighboring rows per each of the columns within a certain distance from each of the specific rows for training per each of the columns, by using one or more regression operations.

As one example, at the process of (iv), the regression losses have been generated by referring to each of the respective differences of distances between (i) each location of the specific rows for training having each of highest scores per each of the columns on the obstacle segmentation result for training and (ii) each location of the exact rows having each of highest scores per each of the columns on the GT.

As one example, the process of (III) includes steps of: (III-1) supposing that each cell of the grid has been generated by dividing the at least one decoded feature map for testing with respect to the first direction by first intervals and with respect to the second direction by second intervals, concatenating each of features for testing of each of the rows per each of the columns in a direction of a channel, to thereby generate at least one reshaped feature map for testing; and (III-2) generating the obstacle segmentation result for testing which represents where each of the bottom lines of each of the nearest obstacles for testing is estimated as being located among the rows for each of the columns by referring to the reshaped feature map for testing via checking each of estimated positions of each of the bottom lines of each of the nearest obstacles for testing among concatenated channels for each of the columns, wherein the obstacle segmentation result for testing is generated by a softmax operation which normalizes each value corresponding to each channel per each of the columns.

As one example, each of the columns includes one or more pixels in the first direction, and each of the rows includes one or more pixels in the second direction.

As one example, the GT includes information representing on which row each of the bottom lines of each of the nearest obstacles for training is truly located among the rows, per each of the columns, resulting from dividing the training image into $N_c$ rows, and wherein the obstacle segmentation result for training represents on which row each of the bottom lines of each of the nearest obstacles for training is estimated as being located among the rows, per each of the columns, resulting from dividing the training image into $N_c$ rows.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 5 is a drawing exemplary illustrating the input image and its corresponding GT image for detecting the nearest obstacles in accordance with the present invention.

FIG. 6 is a drawing exemplary illustrating operations on the input image to describe a testing method of the CNN for detecting the nearest obstacles in accordance with the present invention.

DETAILED DESCRIPTION OF THE PREFERRED EMBODIMENTS

Figure 1:
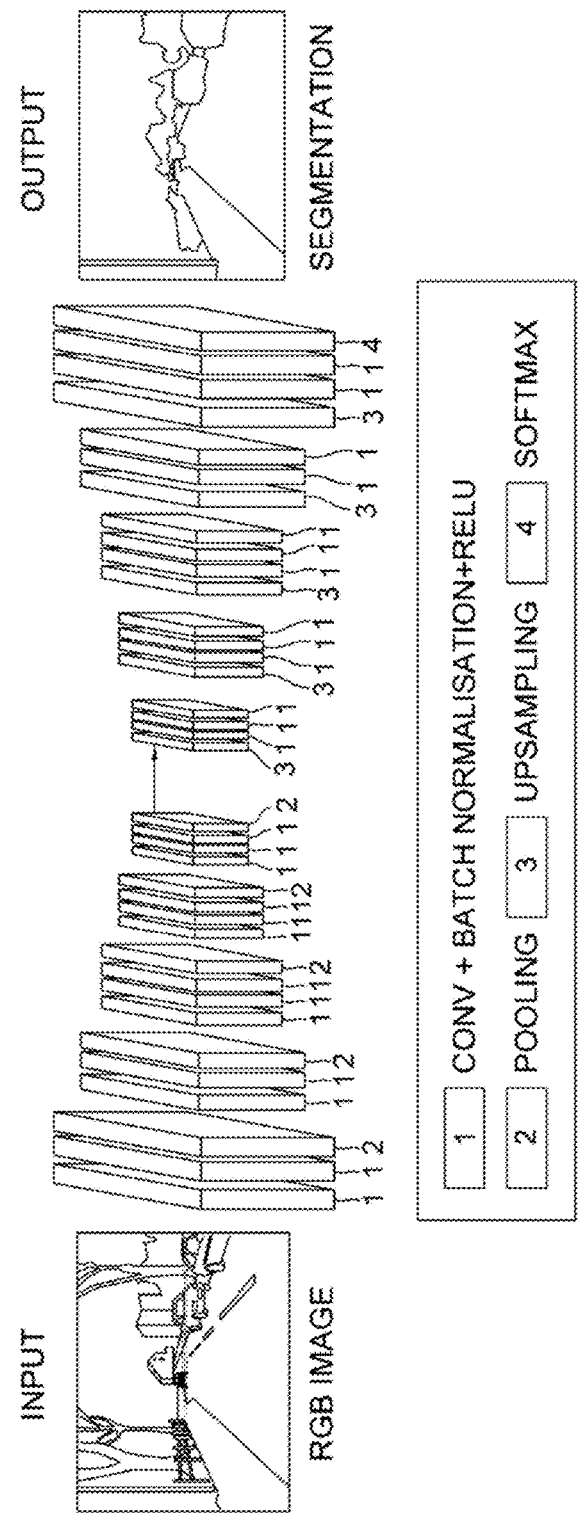
FIG. 1 is a drawing schematically illustrating a conventional process of a general segmentation by using a conventional CNN.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detail description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to the present invention to be carried out easily, the example embodiments of the present invention by referring to attached diagrams will be explained in detail as shown below.

The present invention provides an algorithm capable of detecting nearest obstacles fast with less computation in a high-resolution image. It is an object of detecting the nearest obstacles in accordance with the present invention to identify at least one boundary between a road and at least one obstacle in an input image. Supposing that a direction of rows of the input image is a first direction, and that the direction of columns of the input image is a second direction, the first direction may be divided by first intervals to form multiple columns, and the second direction may be divided by second intervals to form multiple rows, and thus a grid may be generated. Using information on specific rows for each of the columns where each nearest obstacle is estimated as located by checking each of the columns starting from its corresponding lowest cell of the grid along the second direction, locations of the nearest obstacles on a road may be detected. Also, the present invention reduces computational load by (i) a learning process with multi-loss using high-resolution information and (ii) a testing process using low-resolution features only.

Figure 2:
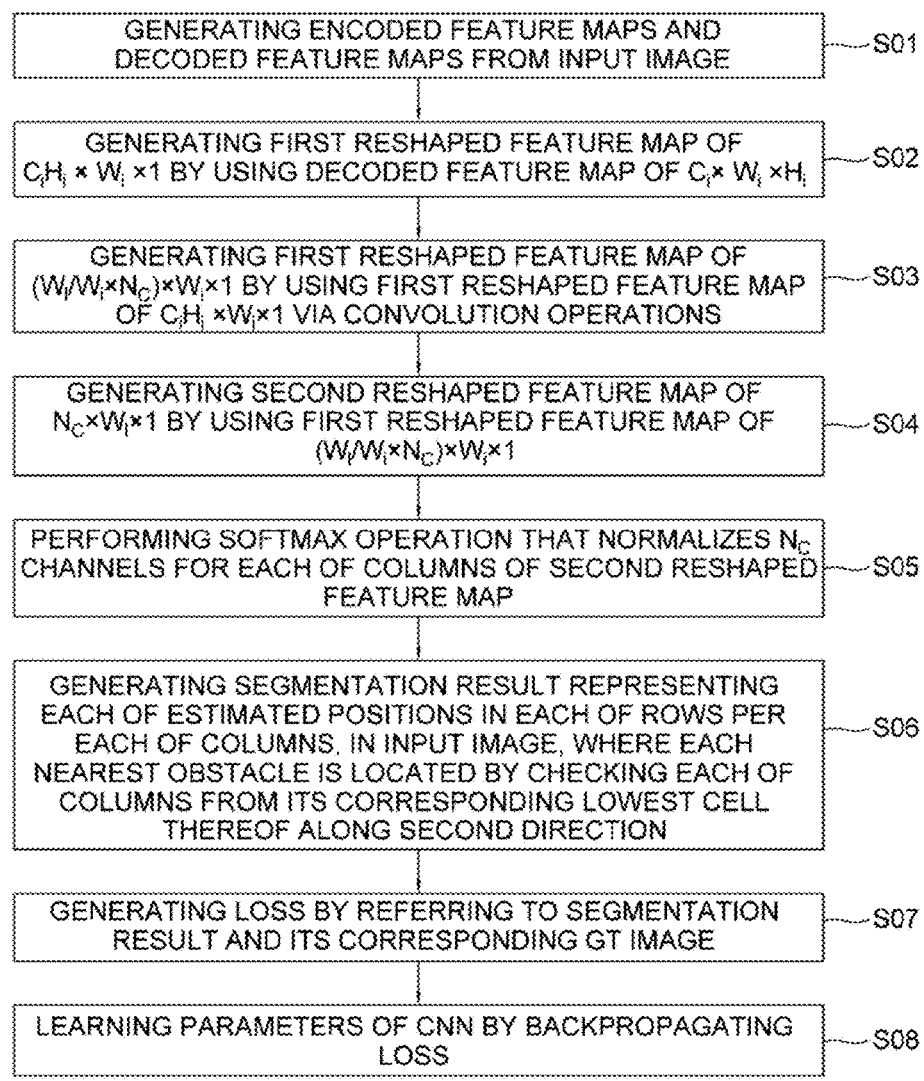
FIG. 2 is a flow chart schematically illustrating a learning method of a CNN for detecting nearest obstacles in accordance with the present invention.
Figure 3:
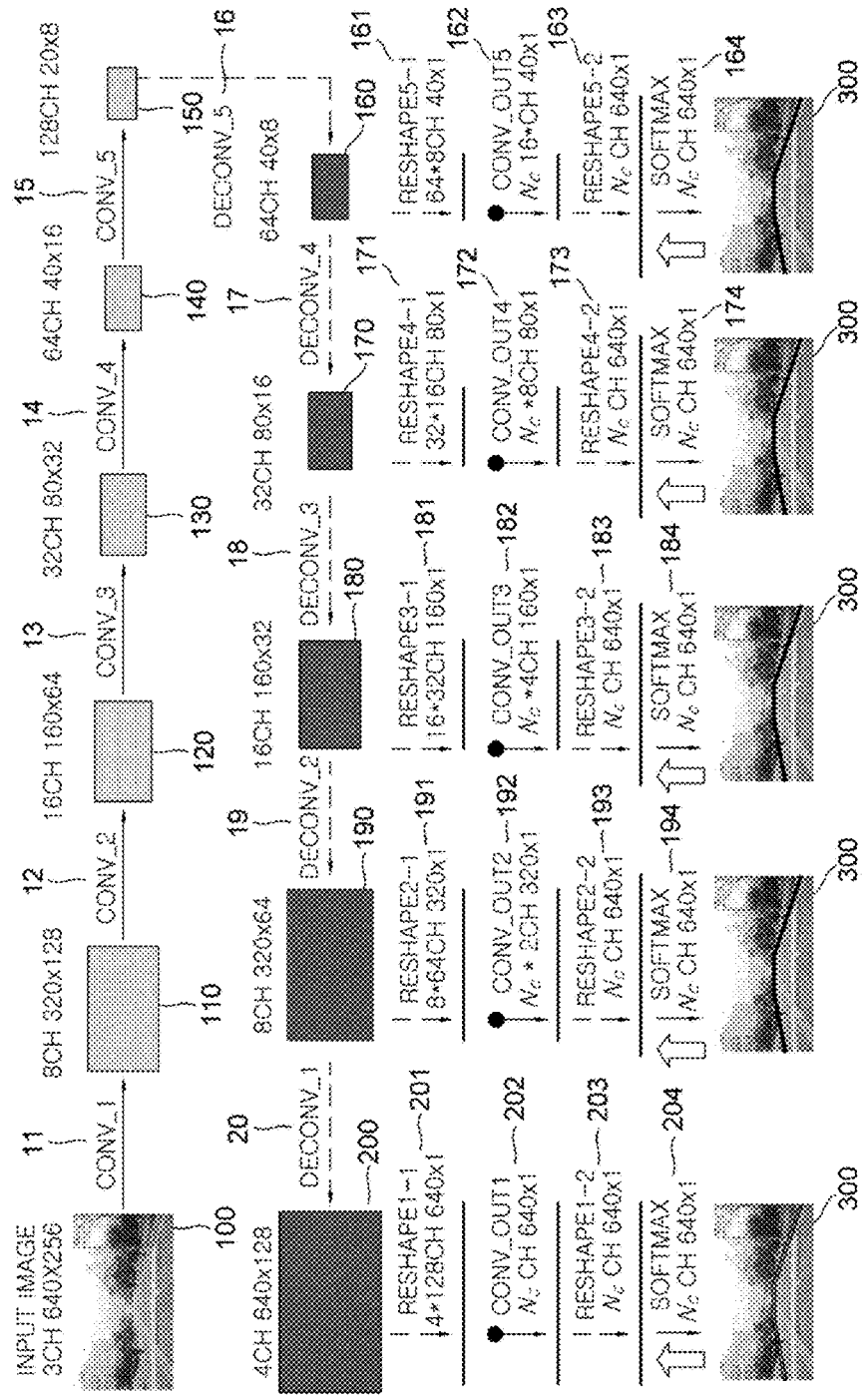
FIG. 3 is a drawing exemplary illustrating a process of operations on an input image to describe the learning method of the CNN for detecting the nearest obstacles in accordance with the present invention.

FIG. 2 is a flow chart schematically illustrating a learning method of a CNN for detecting the nearest obstacles in accordance with the present invention. FIG. 3 is a drawing exemplary illustrating operations on the input image to describe the learning method of the CNN for detecting the nearest obstacles in accordance with the present invention.

By referring to FIGS. 2 and 3, processes of the learning method of the CNN for detecting the nearest obstacles in accordance with the present invention is described in detail as follows.

A process of detecting the nearest obstacles in accordance with the present invention may start with a step S01 of generating encoded feature maps and decoded feature maps from at least one input image. At the step of S01, if a learning device receives the input image as a training image, the learning device may instruct a first to an n-th convolutional layers to respectively and sequentially generate a first encoded feature map to an n-th encoded feature map from the training image, where the CNN for detecting the nearest obstacles may include the first to the n-th convolutional layers. Further, the CNN for detecting the nearest obstacles may include an n-th to a first deconvolutional layers corresponding to the first to the n-th convolutional layers, and the learning device may instruct the n-th to the first deconvolutional layers to respectively and sequentially generate an n-th decoded feature map to a first decoded feature map from the n-th encoded feature map.

For example, by referring to FIG. 3, the CNN for detecting the nearest obstacles may include the first convolutional layer 11 to a fifth convolutional layer 15 and a fifth deconvolutional layer 16 to the first deconvolutional layer 20, and the learning device may receive the training image 100 having a size of 640×256 with 3 ch. This training image is inputted into the first convolutional layer 11 which may generate the first encoded feature map 110 having a size of 320×128 with 8 ch, the second convolutional layer 12 which may generate the second encoded feature map 120 having a size of 160×64 with 16 ch, the third convolutional layer 13 which may generate the third encoded feature map 130 having a size of 80×32 with 32 ch, the fourth convolutional layer 14 which may generate the fourth encoded feature map 140 having a size of 40×16 with 64 ch, and the fifth convolutional layer 15 which may generate the fifth encoded feature map 150 having a size of 20×8 with 128 ch.

As such, the convolutional layers may increase channels of the input image or the feature maps, and may reduce their horizontal and vertical sizes, to thereby generate the encoded feature maps. For example, the second convolutional layer 12 to the fifth convolutional layer 15 may double the channels of the inputted feature map and may reduce its horizontal and vertical sizes in half, to thereby generate the encoded feature maps.

Meanwhile, the learning device may instruct the n-th deconvolutional layer corresponding to the n-th convolutional layer to increase a horizontal size of the n-th encoded feature map by a multiplier to thereby generate the n-th decoded feature map. For example, by referring to FIG. 3, the learning device may instruct the fifth deconvolutional layer 16 to generate the fifth decoded feature map 160 having a size of 40×8 with 64 ch from the fifth encoded feature map 150 having a size of 20×8 with 128 ch.

In general, a deconvolutional layer reduces the number of channels and increases horizontal and vertical sizes, however, the n-th deconvolutional layer in accordance with the present invention reduces the number of the channels of the n-th encoded feature map and increases the horizontal size by the multiplier, e.g., two for doubling, but keeps the vertical size of the feature map. The reason is that, as aforementioned, determining which position has the highest score among the columns of the grid is enough for the present invention. That is, the present invention does not need to check every pixel, unlike a conventional segmentation, nor has need for increase of the vertical size. The present invention provides a method that horizontal resolutions of input and output are the same, thus, does not have a problem of lowering of horizontal resolution according to conventional techniques. Although a high vertical resolution is preferred, that will require too much computational load. Therefore, the present invention proposes a method that only the horizontal resolution is increased to detect the nearest obstacles with less computation. For this purpose, as aforementioned, the n-th deconvolutional layer may reduce the number of the channels of the n-th encoded feature map, and may increase the horizontal size by the multiplier, e.g., two for doubling, but does not change the vertical size.

Describing the process of decoding by referring to FIG. 3 again, the learning device may instruct the fourth deconvolutional layer 17 to generate the fourth decoded feature map 170 having a size of 80×16 with 32 ch from the fifth decoded feature map 160 having a size of 40×8 with 64 ch, the third deconvolutional layer 18 to generate the third decoded feature map 180 having a size of 160×32 with 16 ch from the fourth decoded feature map 170 having a size of 80×16 with 32 ch, the second deconvolutional layer 19 to generate the second decoded feature map 190 having a size of 320×64 with 8 ch from the third decoded feature map 180 having a size of 160×32 with 16 ch, and the first deconvolutional layer 20 to generate the first decoded feature map 200 having a size of 640×128 with 4 ch from the second decoded feature map 190 having a size of 320×64 with 8 ch.

Thus, the deconvolutional layers may reduce the number of feature maps inputted, and may increase the horizontal and the vertical sizes, to thereby generate the decoded feature maps. For example, the fourth deconvolutional layer 17 to the first deconvolutional layer 20 may reduce the number of the channels in half and may double each of the horizontal and the vertical sizes of the inputted feature map, to thereby generate the decoded feature maps.

Meanwhile, the convolutional layers may perform at least one operation of convolution, max pooling, an ReLU, and the deconvolutional layers may perform at least one operation of deconvolution and ReLU.

Then, by referring to FIG. 2, the learning device may generate a first reshaped feature map with a size of $C_iH_i \times W_i \times 1$ by using the decoded feature map with a size of $C_i \times W_i \times H_i$, where the $C_i$ is the number of the channels, the $W_i$ is a size of the columns, and the is $H_i$ is a size of the rows of the decoded feature map at a step of S02.

That is, at a reshaping process in accordance with the present invention, supposing that each cell of the grid with a plurality of rows and a plurality of columns is generated by dividing the at least one decoded feature map with respect to the first direction by the first intervals and with respect to the second direction by the second intervals, the learning device may concatenate each of features of each of the rows per each of the columns in the direction of the channel, to thereby generate at least one reshaped feature map.

Figure 4:
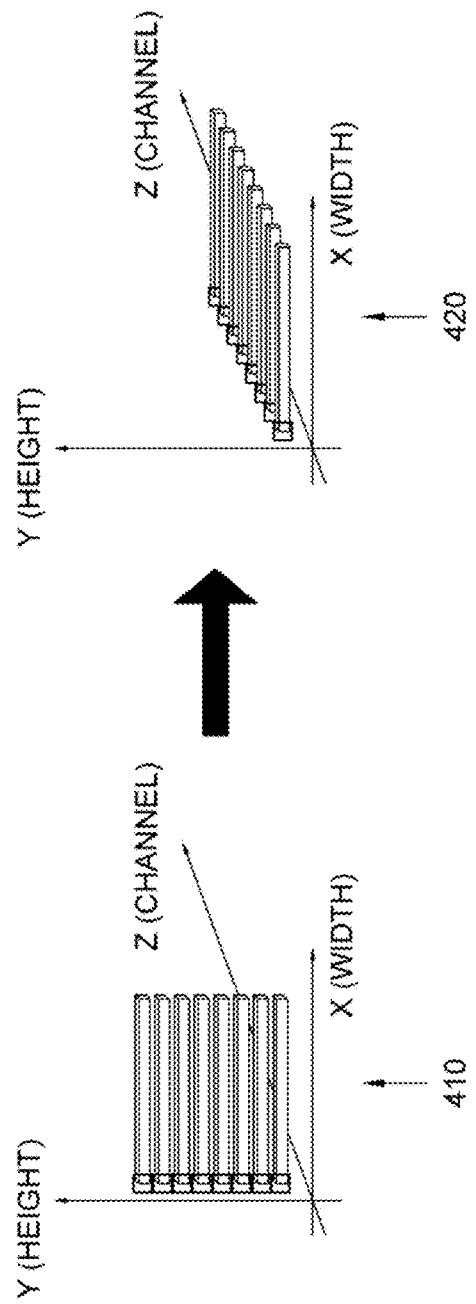
FIG. 4 is a drawing schematically illustrating a reshaping process for detecting the nearest obstacles in accordance with the present invention.

FIG. 4 is a drawing schematically illustrating the reshaping process for detecting the nearest obstacles in accordance with the present invention.

By referring to FIG. 4, at the reshaping process, a decoded feature map may be divided into rows as in the illustrated feature map 410, and each of the features of each of the rows per each of the columns may be concatenated in the direction of the channel as in the illustrated feature map 420. Thus, a feature map with a size of (C×W×H) may be converted into a feature map with a size of ((C×H)×W×1).

In the example of FIG. 4, each square with thick lines on the feature map 410 represents each feature in each row corresponding to the first column of the decoded feature map. Such features in each row are concatenated for each column in the direction of the channel. If the feature map 410 has 8 rows, the feature map 420 may have eight times the number of the channels and an eighth of the height of the feature map 410.

In the example of FIG. 3, the fifth decoded feature map 160 having a size of 40×8 with 64 ch may be converted to the first reshaped feature map 161 having a size of 40×1 with 64*8 ch by a first reshaping process, i.e., RESHAPE 5-1, the fourth decoded feature map 170 having a size of 80×16 with 32 ch may be converted to the first reshaped feature map 171 having a size of 80×1 with 32*16 ch by a first reshaping process, i.e., RESHAPE 4-1, the third decoded feature map 180 having a size of 160×32 with 16 ch may be converted to the first reshaped feature map 181 having a size of 160×1 with 16*32 ch by a first reshaping process, i.e., RESHAPE 3-1, the second decoded feature map 190 having a size of 320×64 with 8 ch may be converted to the first reshaped feature map 191 having a size of 320×1 with 8*64 ch by a first reshaping process, i.e., RESHAPE 2-1, and the first decoded feature map 200 having a size of 640×120 with 4 ch may be converted to the first reshaped feature map 201 having a size of 640×1 with 4*128 ch by a first reshaping process, i.e., RESHAPE 1-1.

For reference, although the first reshaping process is illustrated in FIG. 3 as performed on every decoded feature map, it is not a requirement that every decoded feature map be reshaped, therefore, reshaping a part of the decoded feature maps should suffice.

Then, at a step of S03, the first reshaped feature map with a size of $C_iH_i \times W_1 \times 1$ may be converted to the first reshaped feature map with a size of $$\left(\frac{W_I}{W_i} \times N_c\right) \times W_i \times 1$$

by the convolution operations. Herein, the $W_I$ is a column size of the training image and the $W_i$ is the size of the columns of the decoded feature map. The convolution operation is a 1×1 convolution, whose operands are cells in the grid which range over all of the channels but over just one unit horizontally and vertically, to find out where each of bottom lines of the nearest obstacles is positioned in each of $N_c$ columns of each first reshaped feature map, where $N_c$ is the number the second direction of the input image is divided into. All information on the decoded feature maps along the column direction has been integrated into the channels, for simultaneous operations on all the information, at the first reshaping process, therefore, the convolution operation makes it possible to check all pieces of information on the channels, to thereby find out where each of the bottom lines of each of the nearest obstacles is positioned for each column.

Clearly, in case of the example of the fifth decoded feature map 160, the first reshaping operation and the 1×1 convolution operation may be performed simultaneously if an 8×1 convolution without reshaping is performed. That is, if a height of a specific feature map is N, N×1 convolution may be used. However, in general, the 1×1 convolution operation is implemented on hardware for quick calculation, although an 8×1 kernel or N×1 kernel, which is rarely used, is very slow on calculation. Therefore, it is more effective to separate the reshaping operation and the 1×1 convolution operation.

By referring to a result of the 1×1 convolution operation, if the column size of the inputted feature map is $W_i$, and the column size of the original image is $W_1$, the inputted feature map may be converted to have channels of $$\frac{W_I}{W_i} \times N_c.$$

In the example of FIG. 3, the first reshaped feature map 161 having a size of 40×1 with 64*8 ch of the fifth decoded feature map may be converted to the first reshaped feature map 162 having a size of 40×1 with $N_c$*16 ch by the 1×1 convolution operation, the first. reshaped feature map 171 having a size of 80×1 with 32*16 ch of the fourth decoded feature map may be converted to the first reshaped feature map 172 having a size of 80×1 with $N_c$*8 ch by the 1×1 convolution operation, the first reshaped feature map 181 having a size of 160×1 with 16*32 ch of the third decoded feature map may be converted to the first reshaped feature map 182 having a size of 160×1 with $N_c$*4 ch by the 1×1 convolution operation, the first reshaped feature map 191 having a size of 320×1 with 8*64 ch of the second decoded feature map may be converted to the first reshaped feature map 192 having a size of 320×1 with $N_c$*3 ch by the 1×1 convolution operation, and the first reshaped feature map 201 having a size of 640×1 with 4*128 ch of the first decoded feature map may be converted to the first reshaped feature map 202 having a size of 640×1 with $N_c$ ch by the 1×1 convolution operation.

By referring to FIG. 2 again, at a step of S04, the first reshaped feature map having a size of $$\left(\frac{W_I}{W_i} \times N_c\right) \times W_i \times 1$$

may be converted to a second reshaped. feature map having a size of $N_c \times W_I \times 1$. Herein, the $N_c$ is the number of the rows into which the second direction of the input image is divided for specifying where each of the bottom lines of each of the nearest obstacles is located on each of the columns.

Then at a step of S05, a softmax operation is performed that normalizes each of values corresponding to the $N_c$ channels for each of the columns of the second reshaped feature map, and at a step of S06, the segmentation result is generated representing each of estimated positions of each of the bottom lines of each of the nearest obstacles in each of the specific rows, per each of the columns in the input image, where each of the nearest obstacles is estimated as located by checking each of the columns from its corresponding lowest cell therein along the second direction.

At the step of S04, i.e., the second reshaping process, the outputted feature map having a size of $$\left(\frac{W_I}{W_i} \times N_c\right) \times W_i \times 1$$

may be modified to have a size of $N_c \times W_I \times 1$, with its data fixed but only its shape changed. At the step of S05, i.e., the softmax process, the values of the $N_c$ channels per column may be normalized so that their values range from 0 to 1, then each position of each of the bottom lines of each of the nearest obstacles per each of the columns may be estimated by searching each specific channel with each corresponding highest value by referring to the normalized values.

Accordingly, feature maps may be generated by the 1×1 convolution operation at the step of S03 and the reshaping operation at the step of S04, such that each of the estimated positions of the each of the bottom lines of the each of the nearest obstacles among the rows per each of the columns may be allowed to have each corresponding highest value, and the rest of positions, i.e., the rest of rows, among the rows per each of the columns may be allowed to have lower values. The softmax operation at the step of S05 may be used for finding each largest value among each of the $N_c$ values for each column of the input image then outputting it, to thereby locate each of the positions of each of the nearest obstacles. Then, if each of the bottom lines of each of the nearest obstacles is estimated as present in each specific channel with each corresponding highest value among values of the channels per each of the columns by referring to the normalized values, the segmentation result may be generated such that each of the estimated positions of the each of the bottom lines of the nearest obstacles among the rows per each of the columns has each corresponding highest value and the rest of positions among the rows per each of the columns have lower values, among the $N_c$ rows.

To understand this process, one needs to understand the shape of a final result, i.e., a result of the softmax operation.

The desired output from the learning method of the CNN may be finding each row with each corresponding highest value among the $N_c$ rows for each of the columns in the input image as the position of the nearest obstacles. In order to do so, $N_c$ scores per column may be required. If the number, i.e., the width of the input image, of the columns in the input image is 640, i.e., 640 pixels or 640 columns, then a score map having a size of $N_c$ (channel)33 640(width)33 1(height) may be calculated as an output.

The process of generating the score map having a size of $N_c$ (channel)×640(width)×1(height) as the output is as follows. For example, if the first reshaped feature map 161 having a size of 512(64*8) (channel)×40(width)×1(height) of the fifth decoded feature map by the first reshaping process, i.e., RESHAPE 5-1, is generated, this first reshaped feature map may have forty columns, only a sixteenth of those of the input image. Thus, in this case, sixteen $N_c$ output scores generated from sixteen times of the 1×1 convolution operations may suffice. Therefore, the size of the output 162 from CONV_OUT5 in FIG. 3 must be designed to be $(N_c*16)$ (channel)×40(width)×1(height). Then, the second reshaping process, i.e., RESHAPE 5-2, may be needed to convert the score map having a size of $(N_c*16)$ (channel)×40(width)×1(height) to the scope map having a size of $N_c$ (channel)×640(width)×1(height).

By referring to the example in FIG. 3, the feature map 162 having a size of 40×1 with $N_c*16$ ch may be converted to the feature map 163 having a size of 640×1 with $N_c$ ch by the 1×1 convolution, i.e., CONV_OUT5, and an output 164 is generated such that each of the estimated positions of each of the bottom lines of each of the nearest obstacles among the rows per each of the columns has each corresponding highest value, and that the rest of positions among the rows per each of the columns have lower values, among the $N_c$ rows per each column of 640 by the softmax operation. Then, the feature map 172 having a size of 160×1 with $N_c*8$ ch, the feature map 182 having a size of 160×1 with $N_c*4$ ch, the feature map 192 having a size of 320×1 with $N_c*2$ ch, and the feature map 202 having a size of 640×1 with $N_c$ ch are respectively converted to each of the feature maps 173, 183, 193, and 203 having a size of 640×1 with $N_c$ ch by each of the 1×1 convolution operations of CONV_OUT4 to CONV_OUT1, and then each of outputs 174, 184, 194, and 204 is generated such that each of the estimated positions. Of each of the bottom lines of the nearest obstacles among the rows per each of the columns has each. corresponding highest value, and that the rest of the positions among the rows per each of the columns have lower values, among the $N_c$ rows per each column of 640 by the softmax operation.

That is, the learning device may generate the segmentation result representing each of the estimated positions, in the at least one decoded feature map, where each of the bottom lines of each of the nearest obstacles is estimated as located by checking each of the columns from its. corresponding lowest cell therein along the second direction, i.e., upwards. The learning device may generate the segmentation result by checking each of the estimated positions of each of the bottom lines of each of the nearest obstacles on concatenated channels for each of the columns of the reshaped feature map.

By referring to FIG. 2 again, at least one loss may be generated by referring to the segmentation result and its corresponding at least one GT image at a step of S07, and parameters of the CNN may be learned or optimized by backpropagating the loss at a step of S08.

Herein, the GT image may be an image in which each of exact rows is indicated as corresponding to each of GT positions where each nearest obstacle is truly located on each of the columns from its corresponding lowest cell therein along the second direction, i.e., upwards. FIG. 5 is a drawing exemplarily illustrating the input image and its corresponding GT image for detecting the nearest obstacles in accordance with the present invention. By referring to FIG. 5, the GT image may be generated by designating a nearest object as the nearest obstacle when checking from the bottom to the top per each column, i.e., per column acquired by dividing 640 pixels by the first intervals or per each pixel of the 640 pixels, in the input image. Because the GT image includes information representing on which row each of the bottom lines of each of the nearest obstacles is truly located among the $N_c$ rows, per each of the columns in the input image, and the segmentation result includes information representing on which row each of the bottom lines of each of the nearest obstacles is estimated as located among the $N_c$ rows per each of the columns in the input image, all of the reshaped feature maps 164, 174, 184, 194, and 204 resulting from reshaping the decoded feature map may be generated as having the $N_c$ channels.

The loss at the step of S07 may be a cross-entropy loss. The loss may be backpropagated for learning or optimizing the parameters of the CNN. In the example of FIG. 3, outputs are generated by using five decoded feature maps and thus five losses are generated, however, the backpropagation may be performed by referring to the loss and the outputs from at least part of the five decoded feature maps. Especially, although it is preferable that the loss be used which is generated by referring to the first decoded feature map outputted from the first convolutional layer 20, it is not a requirement.

On condition that the parameters of the CNN have been learned via the above processes, a testing device using the CNN with the learned parameters may detect nearest obstacles from at least one test image as the input image.

FIG. 6 is a drawing exemplarily illustrating operations on the input image to describe a testing method of the CNN for detecting the nearest obstacles in accordance with the present invention. By referring to FIG. 6, unlike the learning device in FIG. 3, a single output suffices, and the fourth deconvolutional layer to the first deconvolutional layer may be omitted because the output may be directly generated using the fifth decoded feature map. As another example, some of the omitted deconvolutional layers may be included.

Detailed explanation of the processes is similar to the description by referring to FIG. 3, thus detecting the nearest obstacles by referring to FIG. 6 is briefly described as follows. First, the testing device may receive the test image 100 and may instruct the first to the n-th convolutional layers 11 to 15 to respectively and sequentially generate a first encoded feature map for testing to an n-th encoded feature map for testing 110, 120, 130, 140, and 150 from the test image 100. Then, the testing device may instruct at least one deconvolutional layer 16 to generate a decoded feature map 160 for testing from the n-th encoded feature map 150 for testing. Then, a reshaped feature map 161 for testing may be generated by concatenating, in a direction of the channel, each of features of each of the rows per each of the columns arranged in the second direction, by referring to the grid, from the decoded feature map 160 for testing. Then, a feature map 162 for testing with channels changed by the 1×1 convolution operations and additional reshaping processes, and a feature map 163 for testing with its channels changed to $N_c$ and the horizontal number of its columns changed to the horizontal number of the test image are generated. Then, the testing device may generate a segmentation result 164 for testing by checking each of the estimated positions of each of the bottom lines of each of the nearest obstacles among the rows per each of the columns on concatenated channels per each of the columns of the reshaped feature map for testing, to thereby detect the nearest obstacles.

Figure 7A:
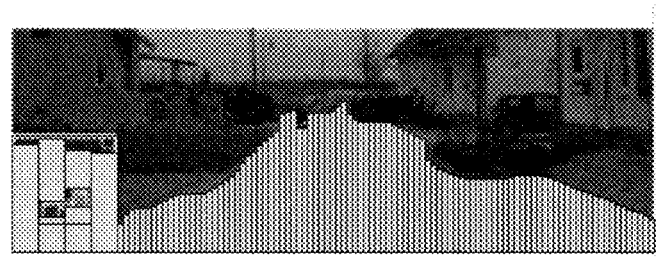
FIG. 7A is a drawing schematically illustrating a result of a conventional object detection.
Figure 7B:
FIGS. 7B and 7C are drawings schematically illustrating a result of object detection in accordance with the present invention.
Figure 7C:

FIG. 7A is a drawing schematically illustrating a result of the conventional object detection. FIGS. 7B and 7C are drawings schematically illustrating the result of the object detection in accordance with the present invention.

FIG. 7A illustrates an example of detecting the nearest obstacles according to the conventional method, which has to check every pixel to determine whether the pixel corresponds to the lane or not, and as a result, its computational load is heavy. However, FIGS. 7B and 7C illustrate the method in accordance with the present invention which detect the nearest obstacles by checking the grid cells of a certain number, e.g., $N_c$, from the bottom to the top of an image to estimate positions where each of the bottom lines of each of the nearest obstacles is located, as indicated in green, and as a result, the nearest obstacles in a high-resolution image are quickly detected with less computation.

Further, the conventional method has a problem that the horizontal resolution of the detection result is lower than the resolution of the input image due to time required for its processing, however, the method in accordance with the present invention resolves this problem because the horizontal resolutions of the input image and the output result are the same.

Additionally, the present invention may utilize high-resolution information when learning by using multi-loss, then in a real world test, high-resolution outputs are generated using only low-resolution feature maps. Therefore, less computation and quick processing are achieved by outputting high-resolution information from the low-resolution feature maps.

However, in the learning method for detecting the nearest obstacles aforementioned, calculation of one or more softmax losses and the detection of the nearest obstacles are performed by only using a result of the softmax operation per each of the columns. In case of learning by only using the softmax losses, if the exact row in a specific column of the input image is a 35 th row, when in one case, the softmax operation results in a 34 th row having the highest probability and in the other case the softmax operation results a 33 rd row having the highest probability, then the softmax losses may be calculated as representing that both results of the softmax operation are wrong, and then the learning process may be performed by referring to each of the softmax losses for each case.

As such, in the above example, one or more regression losses may be calculated as representing that the 34 th row having the highest probability in the first case is a better result than the 33 rd row having the highest probability in the second case, and then the learning method based on the regression losses will produce much better results.

A new learning method for detecting the obstacles by using the regression losses is described below.

Figure 8:
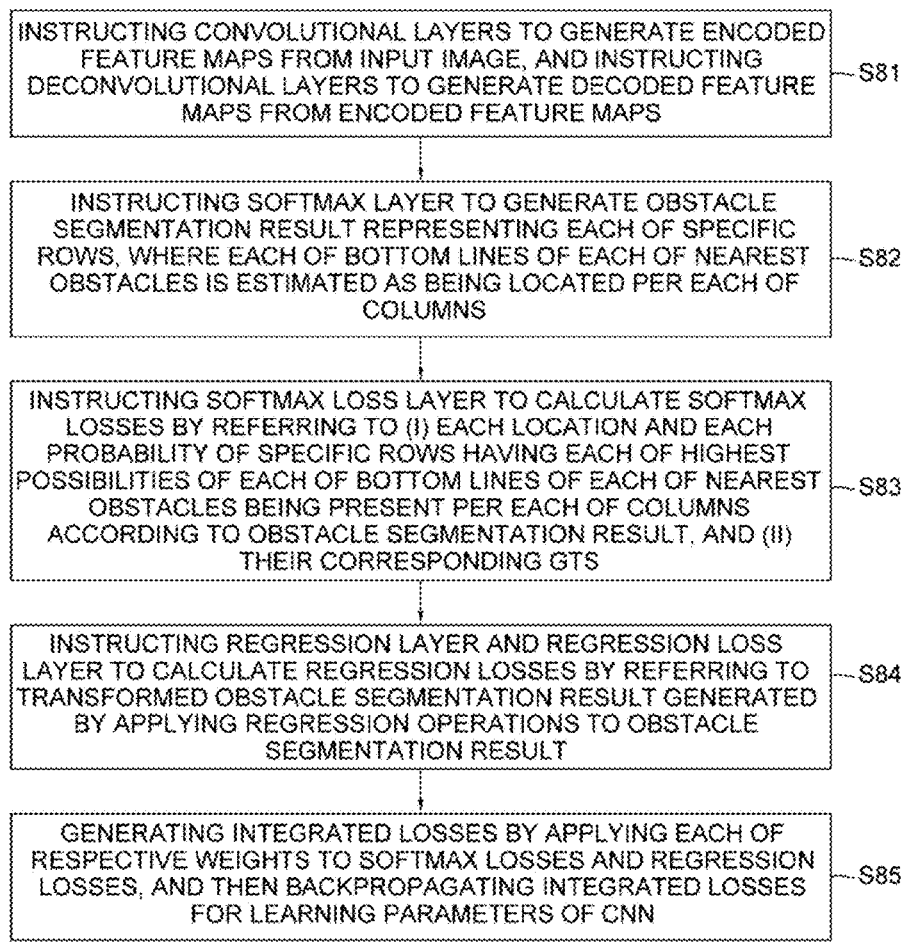
FIG. 8 is a flow chart schematically illustrating a process of detecting the nearest obstacles by using one or more regression losses in accordance with the present invention.
Figure 9:
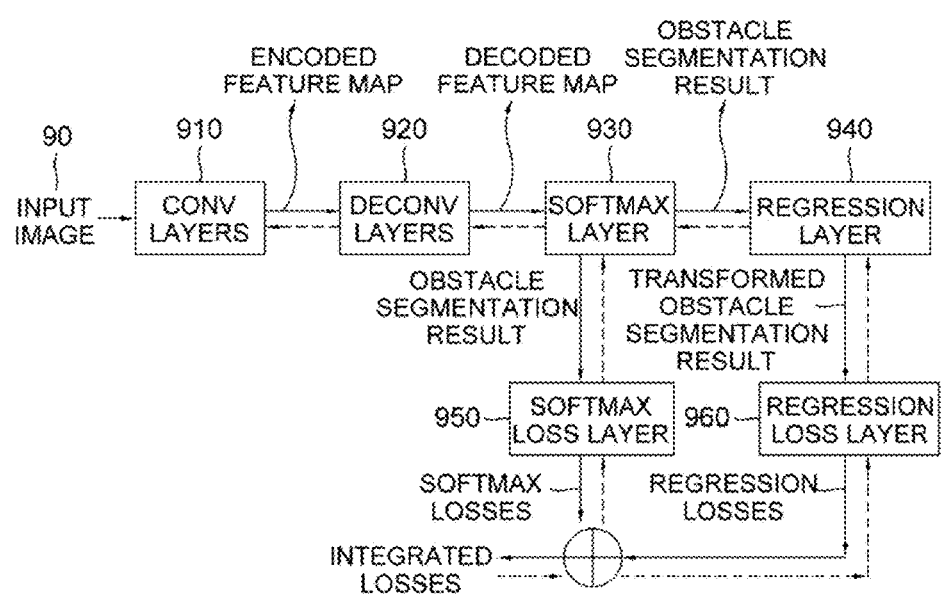
FIG. 9 is a drawing schematically illustrating a configuration of the CNN for detecting the nearest obstacles by using the regression losses in accordance with the present invention.

FIG. 8 is a flow chart schematically illustrating a process of detecting the nearest obstacles by using the regression losses in accordance with the present invention, and FIG. 9 is a drawing schematically illustrating a configuration of the CNN for detecting the nearest obstacles by using the regression losses in accordance with the present invention.

By referring to FIGS. 8 and 9, the learning method by using the regression losses as well as the method for detecting the nearest obstacles aforementioned is described below.

First, the learning device may instruct one or more convolutional layers 910 to generate one or more encoded feature maps from the input image, and may instruct one or more deconvolutional layers 920 to generate one or more decoded feature maps from the encoded feature maps, at a step of S81. Specifically, the learning device may acquire the input image 90 as a training image, may instruct a first to an n-th convolutional layers 910 to respectively and sequentially generate a first encoded feature map to an n-th encoded feature map from the input image, and may instruct an n-th to the first deconvolutional layers 920 to sequentially generate an n-th decoded feature map to a first decoded feature map from the n-th encoded feature map.

Then, on condition that each cell of a grid with a plurality of rows and a plurality of columns is generated by dividing at least one specific decoded feature map, among the n-th decoded feature map to the first decoded feature map, with respect to a first direction and a second direction, wherein the first direction is in a direction of the rows of the specific decoded feature map and the second direction is in direction of the columns thereof, the learning device may instruct softmax layer 930 to generate at least one obstacle segmentation result representing each of specific rows, where each of the bottom lines of each of the nearest obstacles is estimated as being located per each of the columns, by referring to at least one feature of at least part of the n-th decoded feature map to the first decoded feature map, at a step of S82. Herein, the obstacle segmentation result may be generated by the softmax operation which normalizes each value corresponding to each of the rows for each of the columns so that said each value ranges from 0 to 1.

Then, at the step of S83, the learning device may instruct a softmax loss layer 950 to calculate the softmax losses by referring to (i) each location and each probability of the specific rows having each of highest possibilities of each of the bottom lines of each of the nearest obstacles being present per each of the columns according to the obstacle segmentation result generated at the step of S82, and (ii) their corresponding GTs.

The processes described in the steps of S81 to S83 are similar to the processes described in the steps of S01 to S08 of FIG. 2 aforementioned.

For example, the step of S82 may be performed by the learning device, (i) on condition that each cell of the grid has been generated by dividing the at least one decoded feature map with respect to the first direction by first intervals and with respect to the second direction by second intervals, concatenating each of features of each of the rows per each of the columns in a direction of a channel, to thereby generate at least one reshaped feature map; and (ii) generating the obstacle segmentation result which represents where each of the bottom lines of each of the nearest obstacles is estimated as being located among the rows for each of the columns by referring to the reshaped feature map via checking each of estimated positions of each of the bottom lines of each of the nearest obstacles among concatenated channels for each of the column. Herein, the obstacle segmentation result is generated by the softmax operation which normalizes each value corresponding to each channel per each of the columns.

Then, the learning device may instruct a regression layer 940 and a regression loss layer 960 to calculate the regression losses by referring to a transformed obstacle segmentation result generated by applying one or more regression operations to the obstacle segmentation result, at a step of S84. On condition that the softmax operation may allocate a probability value close to 1 to each of the specific rows representing each of the bottom lines of each of the nearest obstacles, and probability values close to 0 to rest of the rows, the learning device may instruct the regression layer 940 to apply the regression operations to the obstacle segmentation result so that the obstacle segmentation result is adjusted to reduce. each of differences between (i) each of probability values of each of the specific rows per each of the columns and (ii) each of probability values of neighboring rows per each of the columns within a certain distance from each of the specific rows per each the columns, to thereby generate the transformed obstacle segmentation result. Then, the learning device may instruct the regression loss layer 960 to calculate the regression losses by referring to (i) the transformed obstacle segmentation result, (ii) each location of the exact rows where each of the bottom lines of each of the nearest obstacles is truly positioned per each of the columns on at least one GT, for each of the columns, and (iii) each location of the specific rows where each of the bottom lines of each of the nearest obstacles is estimated as being positioned per each of the columns on the obstacle segmentation result. Herein, the regression losses may be generated by referring to each of differences between (i) each of the exact rows corresponding to each of the bottom lines of each of the nearest obstacles per each of the columns on the GT and (ii) each of the specific rows per each of the columns resulting from the softmax operation. Herein, the GT may include information on each of the exact rows indicated as corresponding to each of GT positions where each of the bottom lines of each of the nearest obstacles is truly located per each of the columns. Specifically, the GT may include information representing on which row each of the bottom lines of each of the nearest obstacles is truly located among the rows, per each of the columns, resulting from dividing the input image into $N_c$ rows, e.g., 72 rows, along the second direction, and the obstacle segmentation result may include information representing on which row each of the bottom lines of each of the nearest obstacles is estimated as being located among the 72 rows, per each of the columns.

For example, if the true position of the bottom line of the nearest obstacle in a specific column of the input image is on a 50 th row, and if a 49 th row, the 50 th row, and a 51 st row respectively have 0.1, 0.8, and 0.1 as the result from the softmax operation, then the 49 th row, the 50 th row, and the 51 st row may respectively have 0.3, 0.5, and 0.2 as a result from the regression operations.

In detail, the softmax losses may include information that the bottom line of the nearest obstacle is estimated incorrectly as located on the 49 th row by the softmax operation even though the bottom line is truly located on the 50 th row of the specific column in the GT, or may include information that the bottom line of the nearest obstacle is estimated correctly as located on the 50 th row by the softmax operation. Herein, the regression losses may be generated by referring to each of the respective differences of distances between (i) each location of the specific rows having each of highest scores per each of the columns on the obstacle segmentation result and (ii) each location of the exact rows having each of highest scores per each of the columns on the GT. For example, if the softmax operation incorrectly estimates the position of the bottom line of the nearest obstacle as on the 49 th row even though the true position, i.e., the exact row, is on the 50 th row, the regression operations may produce additional information representing that the 49 th row is good enough to be a result of detecting the nearest obstacle and only difference between the estimated row and the exact row of the GT is just one row, by generating +1 or −1 as well as 49 using the regression operations. For example, if the exact row is the 50 th row and the specific row having the highest probability of the bottom line of the nearest obstacle being present on the specific column is the 49 th row by the softmax operation, then the regression losses may be +1.

Then, one or more integrated losses may be generated by applying each of respective weights to the softmax losses and the regression losses, and then the integrated losses may be backpropagated for learning the parameters of the CNN at a step of S85.

The dashed lines with arrow heads in FIG. 9 may represent paths of the backpropagation by using the integrated losses.

In the learning method for detecting the nearest obstacles described by referring to FIGS. 2 to 7, calculation of the softmax losses and obstacle detection are performed by only using the result of the softmax operation per each of the columns. Compared to this, if the regression operations are used as described by referring to FIGS. 8 and 9, the softmax losses may he calculated as representing that the 34 th row having the highest probability acquired in one case is a better result than the 33 rd row having the highest probability acquired in another case, and then the learning method based on the regression losses will be much better.

As such, more refined learning is possible by using the transformed obstacle segmentation result via the regression operations.

As a result, the present invention enables more effective learning by using the regression losses.

On the other hand, the learning method described by referring to FIGS. 8 and 9 may apply to the testing method.

That is, the testing method by using the CNN capable of detecting the nearest obstacles based on the regression losses for the bottom lines of the nearest obstacles in the input image may include steps of: (a) the testing device acquiring at least one test image as the input image, on condition that the learning device has performed processes of (i) instructing the first convolutional layer to the n-th convolutional layer to respectively and sequentially generate a first encoded feature map for training to the n-th encoded feature map for training from at least one training image as the image; (ii) instructing the n-th deconvolutional layer to the first deconvolutional layer to sequentially generate an n-th decoded feature map for training to a first decoded feature map for training from the n-th encoded feature map for training; (iii) if each cell of a grid with a plurality of rows and a plurality of columns is generated by dividing at least one specific decoded feature map for training, among the n-th decoded feature map for training to the first decoded feature map for training, with respect a first direction and a second direction, wherein the first direction is in a direction of the rows of the specific decoded feature map for training and the second direction is in a direction of the columns thereof, generating at least one obstacle segmentation result for training representing each of specific rows for training, where each of bottom lines of each of nearest obstacles for training is estimated as being located per each of the columns, by referring to at least one feature of at least part of the n-th decoded feature map for training to the first decoded feature map for training; (iv) generating the regression losses by referring to each of respective differences of distances between (iv-1) each location of exact rows where each of the bottom lines of each of the nearest obstacles for training is truly located per each of the columns on at least one GT, for each of the columns, and (iv-2) each location of the specific rows for training where each of the bottom lines of each of the nearest obstacles for training is estimated as being located per each of the columns on the obstacle segmentation result for training; and (v) backpropagating the regression losses, to thereby learn the parameters of the CNN, (b) the testing device instructing the first convolutional layer to the n-th convolutional layer to respectively and sequentially generate a first encoded feature map for testing to an n-th encoded feature map for testing from the test image; (c) the testing device instructing the n-th deconvolutional layer to the first deconvolutional layer to sequentially generate an n-th decoded feature map for testing to a first decoded feature map for testing from the n-th encoded feature map for testing; and (d) the testing device, on condition that each cell of a grid with a plurality of rows and a plurality of columns is generated by dividing at least one specific decoded feature map for testing, among the n-th decoded feature map for testing to the first decoded feature map for testing, with respect to the first direction and the second direction, wherein the first direction is in a direction of the rows of the specific decoded feature map for testing and the second direction is in a direction of the columns thereof, generating at least one obstacle segmentation result for testing representing each of specific rows for testing, where each of bottom lines of each of nearest obstacles for testing is estimated as being located per each of the columns, by referring to at least one feature of at least part of the n-th decoded feature map for testing to the first decoded feature map for testing. Herein, the obstacle segmentation result for testing may be generated by the softmax operation which normalizes each value corresponding to each of the rows per each of the columns.

Further, the regression operations may be used only at the learning method to adjust the parameters as aforementioned, or may also be used at the testing method. In this case, the testing method may further include a step of: (e) the testing device performing the regression operations by referring to a result of the softmax operation to adjust the obstacle segmentation result for testing to reduce each of differences between (i) each of probability values of each of the specific rows for testing per each of the columns and (ii) each of probability values of neighboring rows per each of the columns within a certain distance from each of the specific rows for testing per each of the columns, to thereby allow rows near the specific row for testing, having the highest probability of each of the bottom lines of each of the nearest obstacles being present, to be detected as well as the specific row for testing.

As described earlier, if the regression operations are utilized when learning to detect the nearest obstacles, the learning process can harness the differences between the estimated rows and the exact rows, which may be acquired by using difference of distances between the estimated rows and the exact rows, or by using differences of probabilities between the estimated rows and the exact rows, and thus the result of the softmax operation for testing will be significantly improved. Additionally, outputs from the softmax operation may be further adjusted by using regression parameters, and locations of the nearest obstacles may be, depicted more smoothly when detecting the nearest obstacles.

As can be understood by those skilled in the art, it is clear that communication parts of the learning device and the testing device may perform transmission of image data, for example, images described above like the training image, the test image, and the input image, etc., and that processors and/or memories of learning device and the testing device may retain data for feature maps and performing operations, and that the processors of the learning device and the testing device may perform convolution operations, deconvolution operations, and loss value operations, but the scope of the present invention is not limited thereto.

The present invention has an effect of determining paths for the autonomous vehicles by detecting where the nearest obstacles are positioned per each of the columns.

The present invention has another effect of detecting the nearest obstacles in the input image with less computation, without checking every pixel in the input image.

The present invention has still another effect of providing a method for precise detection of locations of the nearest obstacles in the input image.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled human in a field of computer software. Computer readable media include magnetic media such as hard disk, floppy disk, and magnetic tape, optical media such gas CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. They have been provided only to help more general understanding of the present invention. It, however, will be understood by those skilled in the art that various changes and modification may be made from the description without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method for learning one or more parameters of a CNN based on one or more regression losses, comprising steps of:
 (a) learning device instructing a first convolutional layer to an n-th convolutional layer to respectively and sequentially generate a first encoded feature map to an n-th encoded feature map from at least one input image as a training image;
 (b) the learning device instructing an n-th deconvolutional layer to a first deconvolutional layer to sequentially generate an n-th decoded feature map to first decoded feature map from the n-th encoded feature map;
 (c) the learning device, on condition that each cell of a grid with a plurality of rows and a plurality of columns is generated by dividing at least one specific decoded feature map, among the n-th decoded feature map to the first decoded feature map, with respect to a first direction and a second direction, wherein the first direction is in a direction of the rows of the specific decoded feature map and the second direction is in a direction of the columns thereof, generating at least one obstacle segmentation result representing each of specific rows, where each of bottom lines of each of nearest obstacles is estimated as being located per each of the columns, by referring to at least one feature of at least part of the n-th decoded feature map to the first decoded feature map;

(d) the learning device generating the regression losses referring to each of respective differences of distances between (i) each location of exact rows where each of the bottom lines of each of the nearest obstacles is truly located per each of the columns on at least one GT, for each of the columns, and (ii) each location of the specific rows where each of the bottom lines of each of the nearest obstacles is estimated as being located per each of the columns on the obstacle segmentation result; and (e) the learning device backpropagating the regression losses, to thereby learn the parameters of the CNN.

2. The method of claim 1, wherein, at the step of (c), the learning device calculates one or more softmax losses by referring to (i) each location and each probability of the specific rows having each of highest possibilities of each of the bottom lines of each of the nearest obstacles being present per each of the columns according to the obstacle segmentation result, and (ii) their corresponding GTs, and
wherein, at the step of (e), one or more integrated losses are generated by applying each of respective weights to the softmax losses and the regression losses, and then the integrated losses are backpropagated.

3. The method of claim 1, wherein, at the step of (c), the obstacle segmentation result is generated by a softmax operation which normalizes each value corresponding to each of the rows per each of the columns, and
wherein, at the step of (d), the obstacle segmentation result is adjusted to reduce each of differences between (i) each of probability values of each of the specific rows per each of the columns and (ii) each of probability values of neighboring rows per each of the columns within a certain distance from each of the specific rows per each of the columns, by using one or more regression operations.

4. The method of claim 1, wherein, at the step of (d), the regression losses are generated by referring to each of the respective differences of distances between (i) each location of the specific rows having each of highest scores per each of the columns on the obstacle segmentation result and (ii) each location of the exact rows having each of highest scores per each of the columns on the GT.

5. The method of claim 1, wherein the step of (c) includes steps of:
(c1) the learning device, supposing that each cell of the grid has been generated by dividing the at least one decoded feature map with respect to the first direction by first intervals and with respect to the second direction by second intervals, concatenating each of features of each of the rows per each of the columns in a direction of a channel, to thereby generate at least one reshaped feature map; and
(c2) the learning device generating the obstacle segmentation result which represents where each of the bottom lines of each of the nearest obstacles is estimated as being located among the rows for each of the columns by referring to the reshaped feature map via checking each of estimated positions of each of the bottom lines of each of the nearest obstacles among concatenated channels for each of the columns, wherein the obstacle segmentation result is generated by a softmax operation which normalizes each value corresponding to each channel per each of the columns.

6. The method of claim 1, wherein each of the columns includes one or more pixels in the first direction, and each of the rows includes one or more pixels in the second direction.

7. The method of claim 1, wherein the GT includes information representing on which row each of the bottom lines of each of the nearest obstacles is truly located among the rows, per each of the columns, resulting from dividing the input image into $N_c$ rows, and wherein the obstacle segmentation result represents on which row each of the bottom lines of each of the nearest obstacles is estimated as being located among the rows, per each of the columns, resulting from dividing the input image into $N_c$ rows.

8. A testing method by using a CNN capable of detecting one or more nearest obstacles based on one or more regression losses, comprising steps of:
(a) a testing device acquiring at least one test image as at least one input image, on condition that the learning device performed processes of (i) instructing a first convolutional layer an n-th convolutional layer to respectively and sequentially generate a first encoded feature map for training to an n-th encoded feature map for training from at least one training image, (ii) instructing an n-th deconvolutional layer to a first deconvolutional layer to sequentially generate an n-th decoded feature map for training to a first decoded feature map for training from the n-th encoded feature map for training, (iii) assuming that each cell of a grid with a plurality of rows and a plurality of columns is generated by dividing at least one specific decoded feature map for training, among the n-th decoded feature map for training to the first decoded feature map for training, with respect to a first direction and a second direction, wherein the first direction is in a direction of the rows of the specific decoded feature map for training and the second direction is in a direction of the columns thereof, generating at least one obstacle segmentation result for training representing each of specific rows for training, where each of bottom lines of each of nearest obstacles for training is estimated as being located per each of the columns, by referring to at least one feature of at least part of the n-th decoded feature map for training to the first decoded feature map for training, (iv) generating the regression losses by referring to each of respective differences of distances between (iv-1) each location of exact rows where each of the bottom lines of each of the nearest obstacles for training is truly located per each of the columns on at least one GT, for each of the columns, and (iv-2) each location of the specific rows for training where each of the bottom lines of each of the nearest obstacles for training is estimated as being located per each of the columns on the obstacle segmentation result for training, and (v) backpropagating the regression losses, to thereby learn one or more parameters of the CNN;
(b) the testing device instructing the first convolutional layer to the n-th convolutional layer to respectively and sequentially generate a first encoded feature map for testing to an n-th encoded feature map for testing from the test image;

(c) the testing device instructing the n-th deconvolutional layer to the first deconvolutional layer to sequentially generate an n-th decoded feature map for testing to a first decoded feature map for testing from the n-th encoded feature map for testing; and (d) the testing device, assuming that each cell of a grid with a plurality of rows and a plurality of columns is generated by dividing at least one specific decoded feature map for testing, among the n-th decoded feature map for testing to the first decoded feature map for testing, with respect to the first direction and the second direction, wherein the first direction is in a direction of the rows of the specific decoded feature map for testing and the second direction is in a direction of the columns thereof, generating at least one obstacle segmentation result for testing representing each of specific rows for testing, where each of bottom lines of each of nearest obstacles for testing is estimated as being located per each of the columns, by referring to at least one feature of at least part of the n-th decoded feature map for testing to the first decoded feature map for testing.

9. The method of claim 8, wherein, at the process of (iii), the learning device has calculated one or more softmax losses by referring to (i) each location and each probability of the specific rows for training having each of highest possibilities of each of the bottom lines of each of the nearest obstacles for training being present per each of the columns according to the obstacle segmentation result for training, and (ii) their corresponding GTs, and wherein, at the process of (v), one or more integrated losses has been generated by applying each of respective weights to the softmax losses and the regression losses, and then the integrated losses are backpropagated.

10. The method of claim 8, wherein, at the process of (iii), the obstacle segmentation result for training has been generated by a softmax operation which normalizes each value corresponding to each of the rows per each of the columns, and wherein, at the process of (iv), the obstacle segmentation result for training has been adjusted to reduce each of differences between (i) each of probability values of each of the specific rows for training per each of the columns and (ii) each of probability values of neighboring rows per each of the columns within a certain distance from each of the specific rows for training per each of the columns, by using one or more regression operations.

11. The method of claim 8, wherein, at the process of (iv), the regression losses have been generated by referring to each of the respective differences of distances between (i) each location of the specific rows for training having each of highest scores per each of the columns on the obstacle segmentation result for training and (ii) each location of the exact rows having each of highest scores per each of the columns on the GT.

12. The method of claim 8, wherein the step of (d) includes steps of:

(d1) the testing device, supposing that each cell of the grid has been generated by dividing the at least one decoded feature map for testing with respect to the first direction by first intervals and with respect to the second direction by second intervals, concatenating each of features for testing of each of the rows per each of the columns in a direction of a channel, to thereby generate at least one reshaped feature map for testing; and (d2) the testing device generating the obstacle segmentation result for testing which represents where each of the bottom lines of each of the nearest obstacles for testing is estimated as being located among the rows for each of the columns by referring to the reshaped feature map for testing via checking each of estimated positions of each of the bottom lines of each of the nearest obstacles for testing among concatenated channels for each of the columns, wherein the obstacle segmentation result for testing is generated by a softmax operation which normalizes each value corresponding to each channel per each of the columns.

13. The method of claim 8, wherein each of the columns includes one or more pixels in the first direction, and each of the rows includes one or more pixels in the second direction.

14. The method of claim 8, wherein the GT includes information representing on which row each of the bottom lines of each of the nearest obstacles for training is truly located among the rows, per each of the columns, resulting from dividing the training image into $N_c$ rows, and wherein the obstacle segmentation result for training represents on which row each of the bottom lines of each of the nearest obstacles for training is estimated as being located among the rows, per each of the columns, resulting from dividing the training image into $N_c$ rows.

15. A learning device for learning one or more parameters of a CNN based on one or more regression losses, comprising a processor configured to perform the processes of:

acquiring at least one input image as a training image; and a processor for performing processes of (I) instructing a first convolutional layer to an n-th convolutional layer to respectively and sequentially generate a first encoded feature map to an n-th encoded feature map from the input, (II) instructing an n-th deconvolutional layer to a first deconvolutional layer to sequentially generate an n-th decoded feature map to a first decoded feature map from the n-th encoded feature map, (III) on condition that each cell of a grid with a plurality of rows and a plurality of columns is generated by dividing at least one specific decoded feature map, among the n-th decoded feature map to the first decoded feature map, with respect to a first direction and a second direction, wherein the first direction is in a direction of the rows of the specific decoded feature map and the second direction is in a direction of the columns thereof, generating at least one obstacle segmentation result representing each of specific rows, where each of bottom lines of each of nearest obstacles is estimated as being located per each of the columns, by referring to at least one feature of at least part of the n-th decoded feature map to the first decoded feature map, (IV) generating the regression losses by referring to each of respective differences of distances between (i) each location of exact rows where each of the bottom lines of each of the nearest obstacles is truly located per each of the columns on at least one ground truth (GT), for each of the columns, and (ii) each location of the specific rows where each of the bottom lines of each of the nearest obstacles is estimated as being located per each of the columns on the obstacle segmentation result, and (V) backpropagating the regression losses, to thereby learn the parameters of the CNN.

16. The learning device of claim 15, wherein, at the process of (III), the processor calculates one or more softmax losses by referring to (i) each location and each probability of the specific rows having each of highest possibilities of each of the bottom lines of each of the nearest obstacles being present per each of the columns according to the obstacle segmentation result, and (ii) their corresponding GTs, and wherein, at the process of (V), one or more integrated losses are generated by applying each of respective weights to the softmax losses and the regression losses, and then the integrated losses are backpropagated.

17. The learning device of claim 15, wherein, at the process of (III), the obstacle segmentation result is generated by a softmax operation which normalizes each value corresponding to each of the rows per each of the columns, and wherein, at the process of (IV), the obstacle segmentation result is adjusted to reduce each of differences between (i) each of probability values of each of the specific rows per each of the columns and (ii) each of probability values of neighboring rows per each of the columns within a certain distance from each of the specific rows per each of the columns, by using one or more regression operations.

18. The learning device of claim 15, wherein, at the process of (IV), the regression losses are generated by referring to each of the respective differences of distances between (i) each location of the specific rows having each of highest scores per each of the columns on the obstacle segmentation result and (ii) each location of the exact rows having each of highest scores per each of the columns on the GT.

19. The learning device of claim 15, wherein the process of (III) includes processes of:

(III-1) supposing that each cell of the grid has been generated by dividing the at least one decoded feature map with respect to the first direction by first intervals and with respect to the second direction by second intervals, concatenating each of features of each of the rows per each of the columns in a direction of a channel, to thereby generate at least one reshaped feature map; and (III-2) generating the obstacle segmentation result which represents where each of the bottom lines of each of the nearest obstacles is estimated as being located among the rows for each of the columns by referring to the reshaped feature map via checking each of estimated positions of each of the bottom lines of each of the nearest obstacles among concatenated channels for each of the columns, wherein the obstacle segmentation result is generated by a softmax operation which normalizes each value corresponding to each channel per each of the columns.

20. The learning device of claim 15, wherein each of the columns includes one or more pixels in the first direction, and each of the rows includes one or more pixels in the second direction.

21. The learning device of claim 15, wherein the GT includes information representing on which row each of the bottom lines of each of the nearest obstacles is truly located among the rows, per each of the columns, resulting from dividing the input image into $N_c$ rows, and wherein the obstacle segmentation result represents on which row each of the bottom lines of each of the nearest obstacles is estimated as being located among the rows, per each of the columns, resulting from dividing the input image into $N_c$ rows.

22. A testing device by using a CNN capable of detecting one or more nearest obstacles based on one or more regression losses, comprising a learning device with a processor configured to perform the processes of:

acquiring at least one test image as at least one input image, on condition that the learning device has performed processes of (i) instructing a first convolutional layer to an n-th convolutional layer to respectively and sequentially generate a first encoded feature map for training to an n-th encoded feature map for training from at least one training image, (ii) instructing an n-th deconvolutional layer to a first deconvolutional layer to sequentially generate an n-th decoded feature map for training to a first decoded feature map for training from the n-th encoded feature map for training, (iii) assuming that each cell of a grid with a plurality of rows and a plurality of columns is generated by dividing at least one specific decoded 5 feature map for training, among the n-th decoded feature map for training to the first decoded feature map for training, with respect to a first direction and a second direction, wherein the first direction is in a direction of the rows of the specific decoded feature map for training and the second direction is in a direction of the columns thereof, generating at least one obstacle segmentation result for training representing each of specific rows for training, where each of bottom lines of each of nearest obstacles for training is estimated as being located per each of the columns, by referring to at least one feature of at least part of the n-th decoded feature map for training to the first decoded feature map for training, (iv) generating the regression losses by referring to each of respective differences of distances between (iv-1) each location of exact rows where each of the bottom lines of each of the nearest obstacles for training is truly located per each of the columns on at least one ground truth (GT), for each of the columns, and (iv-2) each location of the specific rows for training where each of the bottom lines of each of the nearest obstacles for training is estimated as being located per each of the columns on the obstacle segmentation result for training, and (v) backpropagating the regression losses, to thereby learn one or more parameters of the CNN; and (I) instructing the first convolutional layer to the n-th convolutional layer to respectively and sequentially generate a first encoded feature map for testing to an n-th encoded feature map for testing from the test image, (II) instructing the n-th deconvolutional layer to the first deconvolutional layer to sequentially generate an n-th decoded feature map for testing to a first decoded feature map for testing from the n-th encoded feature map for testing, and (III) assuming that each cell of a grid with a plurality of rows and a plurality of columns is generated by dividing at least one specific decoded feature map for testing, among the n-th decoded feature map for testing to the first decoded feature map for testing, with respect to the first direction and the second direction, wherein the first direction is in a direction of the rows of the specific decoded feature map for testing and the second direction is in a direction of the columns thereof, generating at least one obstacle segmentation result for testing representing each of specific rows for testing, where each of bottom lines of each of nearest Obstacles for testing is estimated as being located per each of the columns, by referring to at least one feature of at least part of the n-th decoded feature map for testing to the first decoded feature map for testing.

23. The testing device of claim 22, wherein, at the process of (iii), the learning device has calculated one or more softmax losses by referring to (i) each location and each probability of the specific rows for training having each of highest possibilities of each of the bottom lines of each of the nearest obstacles for training being present per each of the columns according to the obstacle segmentation result for training, and (ii) their corresponding GTs, and wherein, at the process of (v), one or more integrated losses has been generated by applying each of respective weights to the softmax losses and the regression losses, and then the integrated losses are backpropagated.

24. The testing device of claim 22, wherein, at the process of (iii), the obstacle segmentation result for training has been generated by a softmax operation which normalizes each value corresponding to each of the rows per each of the columns, and wherein, at the process of (iv), the obstacle segmentation result for training has been adjusted to reduce each of differences between (i) each of probability values of each of the specific rows for training per each of the columns. and (ii) each of probability values of neighboring rows per each of the columns within a certain distance from each of the specific rows for training per each of the columns, by using one or more regression operations.

25. The testing device of claim 22, wherein, at the process of (iv), the regression losses have been generated by referring to each of the respective differences of distances between (i) each location of the specific rows for training having each of highest scores per each of the columns on the obstacle segmentation result for training and (ii) each location of the exact rows having each of highest scores per each of the columns on the GT.

26. The testing device of claim 22, wherein the process of (III) includes steps of:
(III-1) supposing that each cell of the grid has been generated by dividing the at least one decoded feature map for testing with respect to the first direction by first intervals and with respect to the second direction by second intervals, concatenating each of features for testing of each of the rows per each of the columns in a direction of a channel, to thereby generate at least one reshaped feature map for testing; and
(III-2) generating the obstacle segmentation result for testing which represents where each of the bottom lines of each of the nearest obstacles for testing is estimated as being located among the rows for each of the columns by referring to the reshaped feature map for testing via checking each of estimated positions of each of the bottom lines of each of the nearest obstacles for testing among concatenated channels for each of the columns, wherein the obstacle segmentation result for testing is generated by softmax operation which normalizes each value corresponding to each channel per each of the columns.

27. The testing device of claim 22, wherein each of the columns includes one or more pixels in the first direction, and each of the rows includes one or more pixels in the second direction.

28. The testing device of claim 22, wherein the GT includes information representing on which row each of the bottom lines of each of the nearest obstacles for training is truly located among the rows, per each of the columns, resulting from dividing the training image into $N_c$ rows, and wherein the obstacle segmentation result for training represents on which row each of the bottom lines of each of the nearest obstacles for training is estimated as being located among the rows, per each of the columns, resulting from dividing the training image into $N_c$ rows.

* * * * *